United States Patent [19]

Clark

[11] Patent Number: 4,933,609

[45] Date of Patent: Jun. 12, 1990

[54] DYNAMIC CONTROL SYSTEM FOR BRAKING DC MOTORS

[75] Inventor: Harold V. Clark, Los Altos, Calif.

[73] Assignee: Ampex Corporation, Redwood City, Calif.

[21] Appl. No.: 211,523

[22] Filed: Jun. 23, 1988

[51] Int. Cl.⁵ .............................................. H02P 5/06
[52] U.S. Cl. .................................... 318/261; 318/368
[58] Field of Search ............................. 318/56, 86–88, 318/258, 261, 367, 315, 380, 381, 267, 363, 368, 377, 273

[56] References Cited

U.S. PATENT DOCUMENTS

| | | | |
|---|---|---|---|
| 3,188,545 | 6/1965 | Sheheen | 318/261 |
| 3,189,811 | 6/1965 | King | 318/367 |
| 3,297,931 | 1/1967 | Gurwicz | 318/380 |
| 3,541,414 | 11/1970 | Wilkerson | 318/302 |
| 3,568,025 | 3/1971 | Havlicek | 318/258 |
| 3,590,352 | 6/1971 | Ries et al. | 318/258 X |
| 3,697,820 | 10/1972 | Ehret | 312/492 |
| 3,794,898 | 2/1974 | Gross | 318/258 X |
| 4,165,476 | 8/1979 | Weiser | 318/375 X |
| 4,319,170 | 3/1982 | Brent | 318/376 |
| 4,427,931 | 1/1984 | Tsukihashi | 318/317 |

FOREIGN PATENT DOCUMENTS 2014805 2/1979 United Kingdom.

Primary Examiner—William M. Shoop, Jr.
Assistant Examiner—A. Jonathan Wysocki
Attorney, Agent, or Firm—Robert E. Krebs; Richard P. Lange

[57] ABSTRACT

A system for controlling a pulse-driven dc motor includes a pulsed grounding switch, an inductor connected between the pulsed grounding switch and the armature of the dc motor, and a tracking circuit connected across the inductor. The control system further includes a variable resistor that provides a series path through the inductor for dissipating generated armature current from the motor. In operation, the resistance provided by the variable resistor depends upon the counter emf generated by the motor and upon transient voltages induced across the inductor when the pulsed grounding switch is periodically opened and closed. More particularly, the variable resistor provides minimal resistance when the back emf of the motor is low and provides increasing resistance as the back emf of the motor increases.

24 Claims, 5 Drawing Sheets

DYNAMIC CONTROL SYSTEM FOR BRAKING DC MOTORS

BACKGROUND OF THE INVENTION

The present invention generally relates to control systems for direct current motors and, more particularly, to systems for controlling the braking of direct current motors.

STATE OF THE ART

When operating a direct current (dc) motor with a switched or "pulsed" voltage source, it is often desirable to control the rate at which the motor is slowed or braked. Braking control is desirable, for example, when pulse-driven dc motors are used to drive magnetic tapes in devices such as videotape record and playback machines. In such applications, it is often desirable to stop and reverse motor rotation as rapidly as possible but without damaging a tape being driven by the motor. In other words, it is often desirable to brake and reverse pulse-driven dc motors rapidly but smoothly.

Although mechanical systems can be used for rapid frictional braking, those systems are difficult to precisely control and can lose their effectiveness because of wear. To overcome the shortcomings of mechanical systems for braking pulse-driven dc motors, it is known to use electrical braking techniques. Generally speaking, electrical braking techniques make use of the fact that a dc motor, because of its rotational momentum, operates as an electrical generator after its driving current is turned off; that is, in electrical braking, a motor is slowed by dissipating its generated electrical energy. More particularly, in conventional electrical braking, a dc motor's generated electrical energy is dissipated through a constant resistive electrical load (i.e., fixed resistance) connected external to the motor.

Although electrical braking of pulsed-driven dc motors has benefits, there are complications. One complication, for instance, is that switching circuits are required so that an electrical braking load can be disconnected when a dc motor is operated as a motor. In addition, known electrical braking systems do not consistently bring dc motors to rapid, smooth stops.

The present invention, as described in the following, provides a system to effectively control electrical braking loads for pulse-driven dc motors to optimize energy dissipation while smoothly braking the motors.

SUMMARY OF THE INVENTION

Generally speaking, the present invention provides a system for controlling a pulse-driven dc motor. In one embodiment the control system includes a pulsed grounding switch, an inductor connected between the pulsed grounding switch and the armature of the dc motor, and a tracking circuit connected across the inductor. The control system further includes a variable resistive means that provides a series path through the inductor for dissipating generated armature current from the motor. In operation, the resistance of the variable resistive element depends upon the counter emf generated by the motor and upon transient voltages induced across the inductor when the pulsed grounding switch is periodically opened and closed. Preferably, the active resistive element includes a transistor whose collector is grounded, whose emitter is connected to the pulsed grounding switch and whose base is connected to the armature, and a variable resistor connected between the base of said transistor and the armature. In operation of the system the variable resistor provides minimal resistance when the back emf of the motor is low and provides increasing resistance as the back emf of the motor increases.

In another embodiment of the present invention, the control system preferably includes a first pulsed voltage source for driving the dc motor in the forward direction, a second pulsed voltage source for driving the motor in the reverse direction, a first inductor connected between the first voltage source and the motor's armature, a second inductor connected between the second voltage source and the armature. Further in this embodiment, the control system includes a first tracking circuit connected across the first inductor for providing a path to ground for armature current when braking rotation of the motor in the reverse direction. Still further in this embodiment, the control system includes a second tracking circuit connected across the second inductor for providing a path to ground for armature current when braking rotation of the motor in the forward direction. Each of the tracking circuits preferably includes a transistor whose collector is grounded, whose emitter is connected to the pulsed grounding switch and whose base is connected to the armature, and a variable resistor connected between the base of the transistor and the armature.

BRIEF DESCRIPTION OF THE DRAWINGS

In the various drawings, common elements are given the same reference numbers.

DETAILED DESCRIPTION OF THE PREFERRED EMBODIMENT

In the following figures, there are shown various embodiments of systems to control the braking of pulse-driven dc motors. In practice, the motors can be variable-magnetic-flux motors or constant-magnetic flux motors, also known as permanent-magnet dc motors. Typically, pulse-driven dc motors are capable of being driven in either direction, although bi-directionality is not required for the motor 1 in the system illustrated in FIG. 1.

Figure 1:
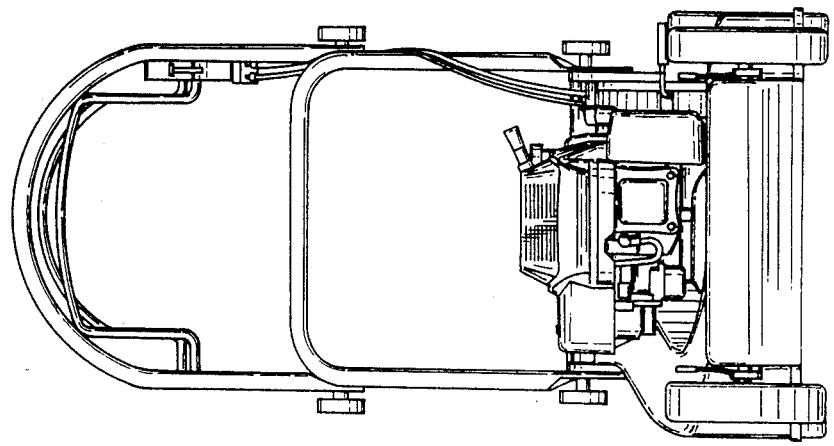
FIG. 1 is a functional block diagram of one embodiment of a braking control system in accordance with the present invention.

Referring now to FIG. 1, dc motor 1 has armature winding terminals 2 and 3, the latter of which is connected to ground through resistor 4. Motor 1 is driven by a pulse-modulated voltage source 5 which provides, at node 10, a train of generally rectangular voltage pulses. (FIG. 5A shows an example of driving pulses having positive polarity for driving motor 1 in the forward direction.) When motor 1 is employed to drive a tape capstan in a videotape record and playback machine, for example, the pulse repetition rate is normally constant at a rate ranging from about 15,000 herz to about 100,000 herz (cycles per second). Normally, pulse-modulated source 5 can be controlled to selectively change the pulse duty cycle and repetition rate in response, for example, to feedback signals from motor 1. To provide such feedback signals, it is convenient to detect armature current through resistor 4, since the torque delivered by motor 1 is generally proportional to the armature current.

As also shown in FIG. 1, an inductor 11 is connected between nodes 10 and 12 or, equivalently, between node 10 and armature terminal 2. In practice, the value of inductor 11 depends upon the internal inductance of motor 1. To the extent that motor 1 has a high internal inductance, inductor 11 can have a small value. Also, a capacitor 13 is connected across armature terminals 2 and 3 external to motor 1.

The braking control system in FIG. 1 generally includes the combination of a pulsed grounding switch 14 connected between ground and a node 18, an inductor 19 coupled between nodes 18 and 12, and a tracking circuit 20. The tracking circuit 20 can be considered to have two ports, one of which is connected across inductor 19 and the other of which is connected between node 18 and ground. The purpose of tracking circuit 20, as will be explained in detail below, is to dissipate the energy of motor 1 smoothly and efficiently.

Operation of the system of FIG. 1 will now be described. Initially, it should be assumed that voltage source 5 is operating to produce uniform voltage pulses at a generally constant frequency to drive motor 1 in the forward rotational direction. Also, it should be initially assumed that pulsed grounding switch 14 is maintained open, thereby open-circuiting node 18 and rendering tracking circuit 20 non-conductive. Under such circumstances, armature current flows from source 5 to node 12 and then to ground through motor 1 and resistor 4. The magnitude of armature current under these conditions is a function of the voltage at node 12. In turn, the voltage at node 12 depends upon the driving voltage provided by forward voltage source 5 as well as upon the impedance values of inductor 11, capacitor 13, resistance 4, and the internal impedance and counter emf of motor 1. In practice, the above-mentioned impedances are chosen such that armature current is smoothed between the pulse duty cycles of forward voltage source 5, as shown in FIG. 5B, so that motor 1 produces substantially "ripple-free" output torque and, hence, smooth driving action. Smooth driving action is highly desirable when, for example, magnetic tapes are driven in videotape recording and playback machines.

At this juncture, it should be understood that the counter emf generated by rotation of motor 1 limits the armature current. Normally, the counter emf is proportional to the rotational speed of motor 1 and, thus, persists at node 12 after forward voltage source 5 is turned off.

Figure 5:
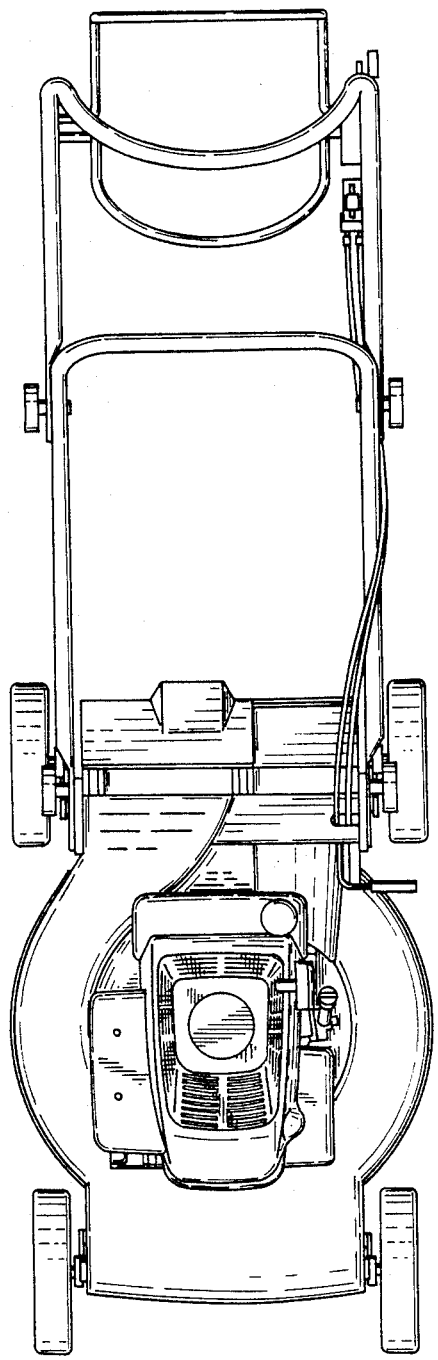
FIGS. 5A and 5B are timing diagrams showing signals in the control systems of the preceding drawings.
Figure 6:
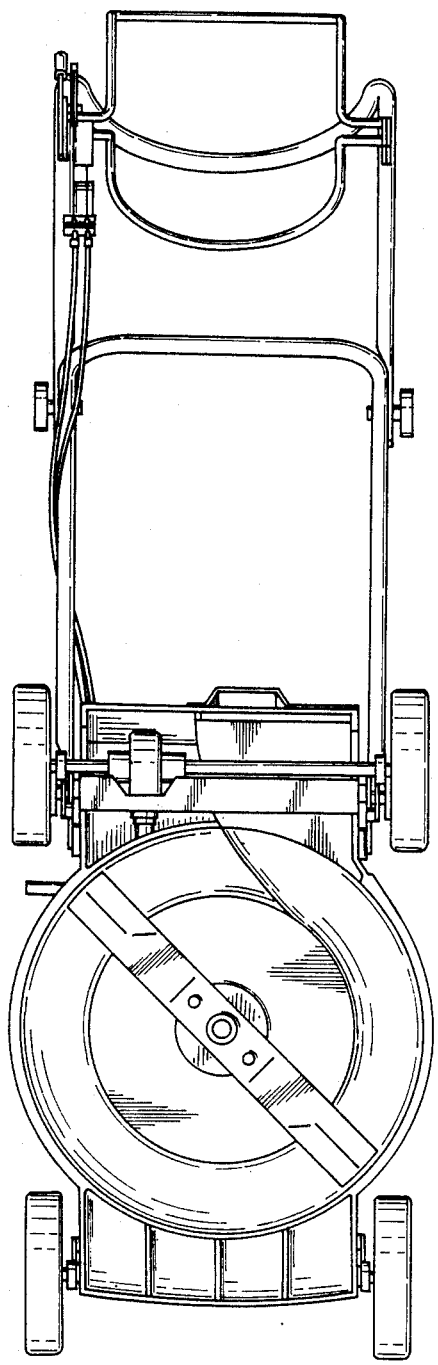

Further in operation of the system of FIG. 1, several transient effects occur when forward voltage source 5 is turned off. One transient effect is that inductor 11 causes armature current to continue to flow for some period. (This transient effect is primarily responsible for the smoothing of armature current as shown in FIG. 5.) In practice, transient current created by inductor 11 is dissipated in only a few milli-seconds.

To operate the braking control system of FIG. 1 after pulse-modulated voltage source 5 is turned off, pulsed grounding switch 14 is activated to periodically ground node 18. The frequency at which pulsed grounding switch 14 operates can be controlled, for example, by feedback of voltage or current through resistor 4. Whenever node 18 is grounded while counter emf persists at node 12, current flows to ground through inductor 19 and pulsed grounding switch 14. This current is accompanied by a voltage pulse which develops across inductor 19 because of the changing magnetic field as the current through the inductor begins to drop. The transient induced voltage biases tracking circuit 20 for operation in its conductive region. Then, during periodic intervals when node 18 is not grounded, generated armature current flows to ground via inductor 19 and tracking circuit 20. As the generated current flows through tracking circuit 20, the energy of motor 1 is dissipated by the resistance of the tracking circuit and by the motor winding resistance, thereby slowing the motor.

Figure 2:
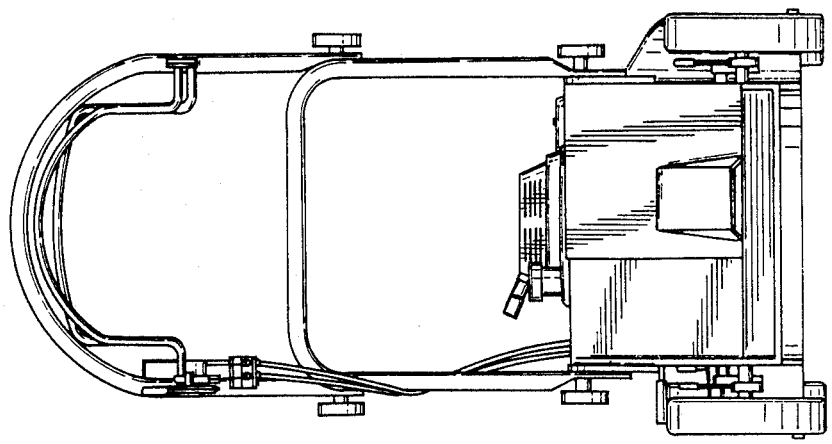
FIG. 2 is a schematic diagram showing specific components of the braking control system of FIG. 1.

FIG. 2 is similar to FIG. 1 but shows specific components to provide the functions ascribed to the functional blocks in FIG. 1. Thus, in FIG. 2, motor 1 is driven in the forward direction by an ac voltage source 25 coupled to a full-wave rectifier 26. The illustrated rectifier 26 comprises a primary winding 27A magnetically coupled to a secondary winding 27B whose center-tap is grounded and whose two terminals are connected to node 10 via diodes 28 and 29, respectively. Together, forward voltage source 25 and rectifier 26 in FIG. 2 are equivalent to the forward voltage source 5 of FIG. 1 and cooperatively operate to produce rectified dc voltage at node 10 such as shown in FIG. 5A.

The braking control system in FIG. 2 includes a pulsed actuator 33 which is connected to operate a switch 35. In the illustrated embodiment, switch 35 is a field effect transistor (FET) which has its gate connected to actuator 33 and its electrodes connected between node 18 and ground. Together, pulsed actuator 33 and FET switch 35 are equivalent to pulsed grounding switch 14 of FIG. 1. Also in the braking control system of FIG. 2, tracking circuit 20 includes a PNP transistor $T_1$ whose collector is grounded, whose emitter is connected to node 18 via a diode 23, and whose base is connected to node 12 via a resistor 22. In practice, a capacitor 24 is also connected between the base of transistor $T_1$ and ground.

Under steady state conditions in the forward driving direction, the system of FIG. 2 operates in the manner previously described for the system of FIG. 1. Under these conditions, nodes 12 and 18 have equal voltage and, therefore, transistor $T_1$ is non-conductive.

When braking is to begin in the system of FIG. 2, forward voltage source 25 is deactivated 15 and pulsed actuator 33 is operated to periodically close FET switch 35, thereby periodically grounding node 18. Whenever node 18 grounded while motor 1 is rotating in the forward direction, counter emf appears at node 12 and generated current flows to ground through the switch and inductor 19. Thereafter, whenever FET switch 35 is periodically reopened, induced voltage develops across inductor 19. The induced voltage, in conjunction with counter emf at node 12 and the voltage drop across diode 23, causes transistor $T_1$ to operate in its active, non-saturated region. That is, under the stated conditions, transistor $T_1$ becomes resistively conductive and generated armature current flows to ground via inductor 19, diode 23, and the emitter-collector path of transistor $T_1$. In practice, the armature current flowing through transistor $T_1$ is generally constant. Therefore, since motor torque is proportional to the armature current, the braking torque is generally constant as rotational momentum of motor 1 dissipates during braking.

The transient response of tracking circuit 20 in FIG. 2 depends upon the internal inductance of motor 1 and upon the values of capacitor 24 and resistor 22 at the base of transistor $T_1$. In practice, the values of capacitor 24 and resistor 22 are chosen to avoid either large voltage or current transients when the braking system begins operation. Also, in practice, it is sometimes desirable that resistor 22 be variable to increase its resistance as forward rotation of motor 1 slows. Automatic resistance decreases can be achieved by implementing resistor 22 as an element having a large positive temperature coefficient. For instance, one suitable element having a large positive temperature coefficient is a small wattage incandescent lamp. In that case, the resistance at the base of transistor $T_1$ will normally decrease as motor back emf decreases, and this will effectively decrease or at least hold constant the resistance of the emitter-collector path through the transistor as motor 1 slows to a stop.

Figure 3:
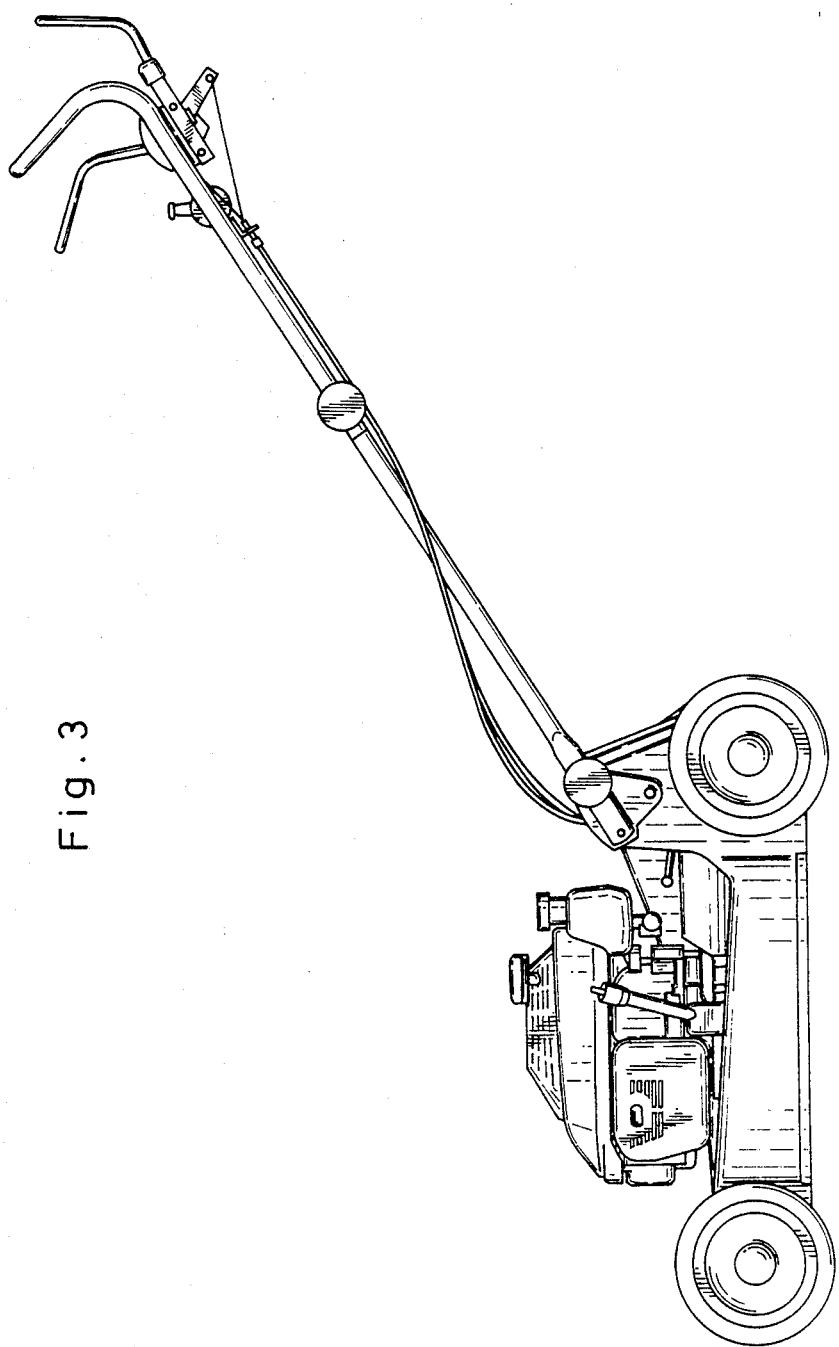
FIG. 3 is a diagram of an alternate embodiment of a braking control system according to the present invention.

Referring now to FIG. 3, a system is illustrated which controls braking both during forward and reverse rotation of a bi-directional, pulse-driven dc motor 1A. In this embodiment, energy for driving motor 1A in the forward direction is provided by a dc voltage source 45, and energy for driving the motor in the reverse direction is provided by an opposite-polarity dc voltage source 45A. The system in FIG. 3 further includes pulsed switches connected to voltage sources 45 and 45A. More specifically, the electrodes of a FET switch 46 are connected between forward voltage source 45 and node 10, and the gate of FET switch 46 is connected to a pulsed actuator 47. Similarly, the electrodes of a FET switch 46A are connected between reverse voltage source 45A and node 18, and the gate of the switch 41A is connected to a pulsed actuator 46A.

Additionally, the system of FIG. 3 includes first and second tracking circuits 20 and 20A, respectively. Second tracking circuit 20A in FIG. 3 can be considered to have two ports, one of which is connected across inductor 11 and the other of which is connected between node 10 and ground. More specifically, in the illustrated embodiment, tracking circuit 20A includes an NPN transistor $T_2$ whose collector is connected to ground, whose emitter is connected to node 10 via diode 23A, and whose base is coupled to node 12 by resistor 22A. A capacitor 24A is connected between the base of transistor $T_2$ and ground.

Operation of the system of FIG. 3 will now be described. When motor 1A is driven in the forward direction, pulsed actuator 47 opens and closes FET switch 46, thereby providing pulsed forward voltage to motor 1A via node 10 and dc source 45. (Again, examples of the forward driving pulses are shown in FIG. 5A.) At all times while motor 1A is being driven in the forward direction, pulsed actuator 47A holds FET switch 46A open, thereby open circuiting node 18 and rendering tracking circuit 20 non-conductive. Then, during intervals when switch 46 is periodically opened, transistor $T_2$ is driven to saturation by the voltage at node 12 in conjunction with the induced voltage across inductor 11 and the potential drop across diode 23A. When saturated, transistor $T_2$ allows armature current to flywheel through its collector-emitter path.

When forward rotation of motor 1A is to be braked in the system of FIG. 3, pulsed actuator 47 holds switch 46 open, thereby open-circuiting node 10 and rendering tracking circuit 20A non-conductive. Then, pulsed actuator 47A is operated to periodically open and close switch 46A, thereby periodically reversing voltage at node 18. Whenever switch 46A is opened after node 18 has been reversed, tracking circuit 20 operates in the manner described in conjunction with the embodiment in FIG. 2. That is, during such intervals, voltage induced by inductor 19 and the counter emf at node 12 drives transistor $T_1$ to conduct in its active but non-saturated region, thus allowing armature current to flow to ground through the collector-emitter path and, thus, dissipating forward rotational momentum of motor 1A.

After forward rotation of motor 1A stops in the system of FIG. 3, the motor can be driven in the reverse direction. During such times, pulsed actuator 47 continues to hold switch 46 open, thereby open circuiting forward voltage source 45. Then, to drive motor 1A in the reverse direction, pulsed actuator 47A periodically opens and closes FET switch 46A, thereby providing pulsed driving voltage to node 18 from reverse voltage source 45A. When switch 46A is opened under conditions where motor 1A is being driven in the reverse direction, the voltage induced across inductor 19 in conjunction with counter emf at node 12 and the potential drop across diode 23, causes transistor $T_1$ to saturate. Consequently, when motor 1A is driven in the reverse direction, reverse motor current flywheels through the emitter-collector path of transistor $T_1$.

When reverse rotation of motor 1A is to be braked in the system of FIG. 3, switch 46A is held open by pulsed actuator 47A, thereby open circuiting node 18 and rendering tracking circuit 20 non-conductive. Then, switch 46 is periodically opened and closed. Under such conditions, voltage transients are induced by inductor 11 which cause transistor $T_2$ to operate in its active but unsaturated region, thereby allowing generated current to flow from ground through the emitter-collector path of the transistor. Thus, when motor 1A is braked in the reverse direction, tracking circuit 20A dissipates the motor's reverse rotational momentum in a manner analogous to the way in which tracking circuit 20 dissipates forward rotational momentum during forward braking.

Also, as to the system in FIG. 3, it should be appreciated that resistors 22 and 22A can be variable. Again, automatic variations in the resistance ca be accomplished by using small wattage incandescent lamps as the resistors.

Figure 4:
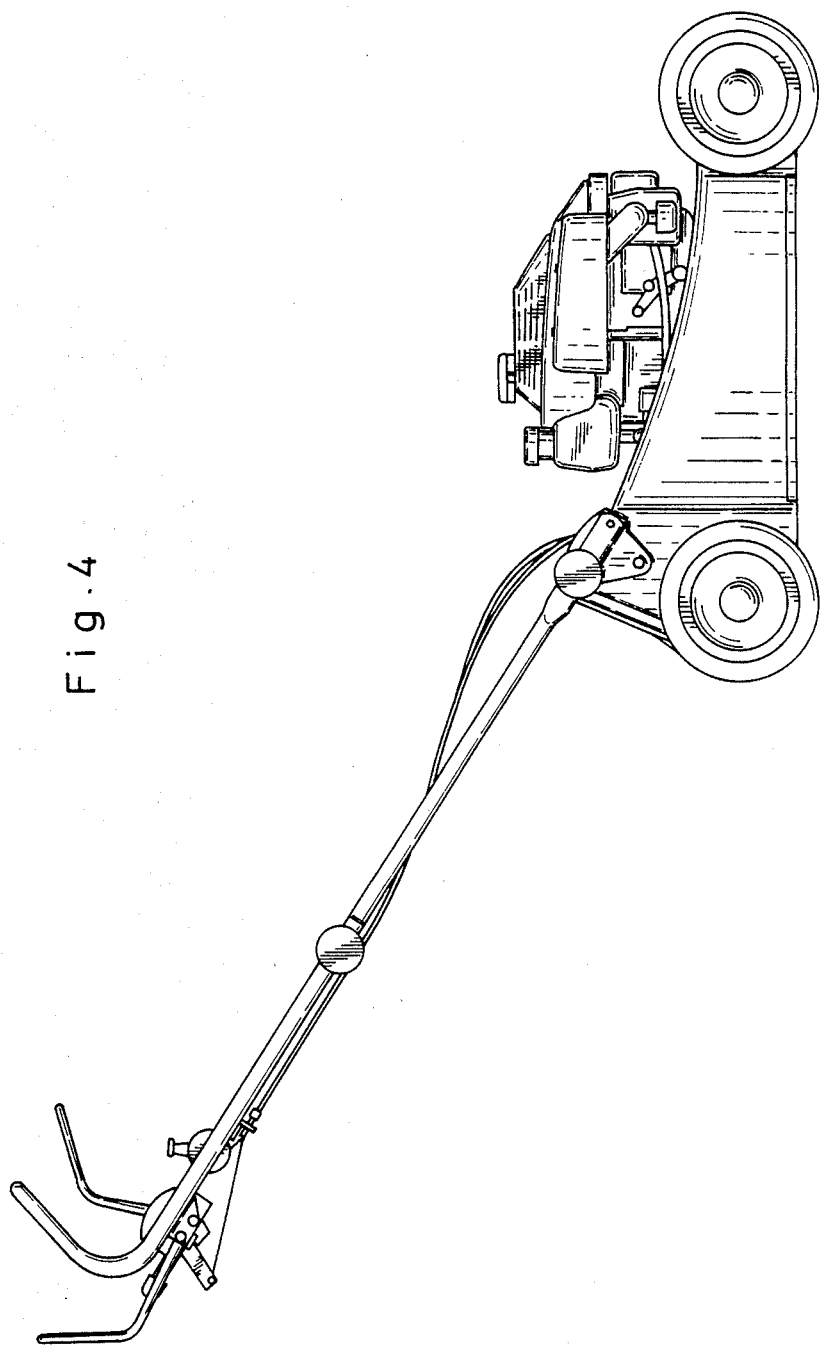
FIG. 4 is a diagram of yet another alternate embodiment of a braking control system according to the present invention.

FIG. 4 shows an alternative embodiment of a system to control braking both during forward and reverse rotation of bi-directional motor 1A. In this embodiment, motor 1A is driven in the forward direction by ac voltage source 25 coupled to a full-wave rectifier 26. As indicated by the reference numerals, those devices are essentially the same as the forward voltage source and rectifier in FIG. 2. Further in the system of FIG. 4, motor 1A is driven in the reverse direction by an opposite-polarity ac voltage source 25A. This latter voltage source is essentially the same as voltage source 25 except that it produces opposite polarity voltage.

Further, the system of FIG. 4 includes first and second tracking circuit 51 and 51A, respectively. Like the previously described tracking circuits, first tracking circuit 51 can be considered to have two ports. More specifically, in this embodiment, first tracking circuit 51 includes NPN transistor $T_2$ whose collector is connected to ground, whose base is coupled to node 12 by resistor 22A, and whose emitter is connected, to the center tap of secondary coil 27B of rectifier 26. Similarly, second tracking circuit 51A includes a PNP transistor T₁ whose collector is connected to ground, whose base is coupled to node 12 by resistor 22, and whose emitter is connected to the center tap of secondary coil 47B of rectifier 46.

In operation, the system of FIG. 4 operate in substantially the same manner as the system of FIG. 3, except that the voltage sources 25 and 25A provide alternating current rather than direct current. This distinction is not critical, however, because rectifiers 26 and 26A produce rectified voltage pulses at their outputs.

While the invention has been described with reference to certain preferred embodiments, it will be evident to those skilled in the art that many variations and adaptations thereof may be made without departing from the spirit and scope of the following claims. For example, workers skilled in the art will recognize that the frequencies and duty cycles of the driving voltages, as well as the frequencies and duty cycles of the pulsed grounding circuits, can be controlled by voltage or current feedback from motor 1. In particular, the duty cycles of the pulsed actuators can be increased with decreasing motor speed to, thereby, increase the voltages induced by inductors 19.

What is claimed is:

1. A control system for a pulse-driven dc motor, comprising:
   a pulsed grounding switch;
   inductance means connected between the pulsed grounding switch and the armature of the dc motor; and
   a tracking circuit connected across the inductance means, the tracking circuit including an active resistive element of variable resistance whose resistance depends upon counter emf generated by the dc motor and upon transient voltages induced across the inductance means by periodically opening and closing the pulsed grounding switch, said active resistive element providing a series path through the inductance means for dissipating generated armature current from the dc motor.

2. A control system in accordance with claim 1 wherein the active resistive element is a transistor.

3. A control system in accordance with claim 2 wherein the transistor is a PNP transistor whose collector is grounded, whose emitter is connected to the pulsed grounding switch, and whose base is connected to the armature.

4. A control system in accordance with claim 3 wherein the active resistive element of variable resistance is connected between the base of said transistor and the armature.

5. A control system in accordance with claim 4 wherein the resistor provides minimal resistance when the back emf of the motor is low and provides increasing resistance as the back emf of the motor increases.

6. A control system in accordance with claim 4 wherein said variable resistor has a positive temperature coefficient.

7. A control system in accordance with claim 5 wherein said variable resistor is an incandescent lamp.

8. A control system according to claim 4 further including a capacitor connected between the base of said transistor and ground.

9. A control system according to claim 4 further including a diode connected between the emitter of the transistor and the pulsed grounding switch.

10. A control system according to claim 1 wherein the pulsed grounding switch includes a pulsed actuator and a switch connected between the inductance means and ground for operation by the pulsed actuator to periodically ground the inductance means.

11. A control system according to claim 10 wherein the pulsed actuator is controlled by feedback from the motor.

12. A control system according to claim 10 wherein the pulsed actuator comprises an ac voltage source connected to a full-wave rectifier having primary and secondary windings.

13. A control system according to claim 12 wherein the emitter of the transistor is connected to the center tap of the secondary winding of the full-wave rectifier.

14. A system for controlling a reversible, pulse-driven dc motor comprising:
   a first source of pulsed voltage connected to drive the dc motor in the forward rotational direction;
   a second source of pulsed voltage connected to drive the motor in the reverse rotational direction;
   first induction means connected between the first voltage source and one armature winding of the motor;
   second induction means connected between the second voltage source and the one armature winding;
   first tracking circuit means connected across the first inductive means for providing a path to ground for armature current, which path has variable resistance during braking of motor rotation in the reverse direction; and
   second tracking circuit means connected across said second inductive means for providing a path to ground for armature current, which path has variable resistance during braking of motor rotation in the forward direction.

15. A control system in accordance with claim 14, wherein the first tracking circuit includes an NPN transistor and the second tracking circuit includes a PNP transistor.

16. A control system in accordance with claim 15 further including first and second pulsed grounding switches connected to the NPN and PNP transistors, respectively.

17. A control system in accordance with claim 15 wherein the PNP transistor's collector is grounded, its emitter is connected to the first pulsed grounding switch, and its base is connected to the motor armature winding.

18. A control system in accordance with claim 16 further including resistors connected between the bases of each of the transistor and the motor armature winding.

19. A control switch in accordance with claim 18 wherein said resistors are variable.

20. A control system in accordance with claim 19 wherein said variable resistors each have positive temperature coefficients.

21. A control system in accordance with claim 18 wherein at least one of said resistor is an incandescent lamp.

22. A system for controlling the dissipation of energy from a pulse-driven dc motor, comprising:
   a pulsed grounding switch;

inductance means connected between the pulsed grounding switch and the armature of the dc motor;

a tracking circuit connected across the inductance means, the tracking circuit including an active resistive element of variable resistance that depends upon the counter emf generated by the dc motor and upon transient voltages induced across the inductance means when the pulsed grounding switch is periodically opened and closed, said active resistive element providing a series path through the inductance means for dissipating generated armature current from the dc motor; the active resistive element including:

a transistor whose collector is grounded, whose emitter is connected to the pulsed grounding switch and whose base is connected to the armature; and a variable resistor connected between the base of said transistor, and the armature which resistor provides minimal resistance when the back emf of the motor is low and provides increasing resistance as the back emf of the motor increases.

23. A braking system in accordance with claim 22 wherein said variable resistor has a positive temperature coefficient.

24. A braking system in accordance with claim 23 wherein said variable resistor is an incandescent lamp.

* * * * *

UNITED STATES PATENT AND TRADEMARK OFFICE
CERTIFICATE OF CORRECTION

PATENT NO. : 4,933,609　　　　　　　　　　　　　　Page 1 of 5

DATED : June 12, 1990

INVENTOR(S) : Harold V. Clark

It is certified that error appears in the above-identified patent and that said Letters Patent is hereby corrected as shown below:

The title page showing the illustrative figure should be deleted appear as per attached title page.

In the drawings Figs. 1-6 should be deleted to be replaced with Fig. 1, Fig. 2, Fig.3, Fig.4, Fig.5A and Fig. 5B as shown on the attached sheets.

Signed and Sealed this

Second Day of July, 1991

Attest:

HARRY F. MANBECK, JR.

*Attesting Officer*　　　　　*Commissioner of Patents and Trademarks*

United States Patent [19]

Clark

[11] Patent Number: 4,933,609
[45] Date of Patent: Jun. 12, 1990

[54] DYNAMIC CONTROL SYSTEM FOR BRAKING DC MOTORS

[75] Inventor: Harold V. Clark, Los Altos, Calif.

[73] Assignee: Ampex Corporation, Redwood City, Calif.

[21] Appl. No.: 211,523

[22] Filed: Jun. 23, 1988

[51] Int. Cl.$^5$ .............................................. H02P 5/06
[52] U.S. Cl. ...................................... 318/261; 318/368
[58] Field of Search ................. 318/56, 86–88, 318/258, 261, 367, 315, 380, 381, 267, 363, 368, 377, 273

[56] References Cited

U.S. PATENT DOCUMENTS

| | | | |
|---|---|---|---|
| 3,188,545 | 6/1965 | Sheheen | 318/261 |
| 3,189,811 | 6/1965 | King | 318/367 |
| 3,297,931 | 1/1967 | Gurwicz | 318/380 |
| 3,541,414 | 11/1970 | Wilkerson | 318/302 |
| 3,568,025 | 3/1971 | Havlicek | 318/258 |
| 3,590,352 | 6/1971 | Ries et al. | 318/258 X |
| 3,697,820 | 10/1972 | Ehret | 312/492 |
| 3,794,898 | 2/1974 | Gross | 318/258 X |
| 4,165,476 | 8/1979 | Weiser | 318/375 X |
| 4,319,170 | 3/1982 | Brent | 318/376 |
| 4,427,931 | 1/1984 | Tsukihashi | 318/317 |

FOREIGN PATENT DOCUMENTS 2014805 2/1979 United Kingdom .

Primary Examiner—William M. Shoop, Jr.
Assistant Examiner—A. Jonathan Wysocki
Attorney, Agent, or Firm—Robert E. Krebs; Richard P. Lange

[57] ABSTRACT

A system for controlling a pulse-driven dc motor includes a pulsed grounding switch, an inductor connected between the pulsed grounding switch and the armature of the dc motor, and a tracking circuit connected across the inductor. The control system further includes a variable resistor that provides a series path through the inductor for dissipating generated armature current from the motor. In operation, the resistance provided by the variable resistor depends upon the counter emf generated by the motor and upon transient voltages induced across the inductor when the pulsed grounding switch is periodically opened and closed. More particularly, the variable resistor provides minimal resistance when the back emf of the motor is low and provides increasing resistance as the back emf of the motor increases.

24 Claims, 5 Drawing Sheets

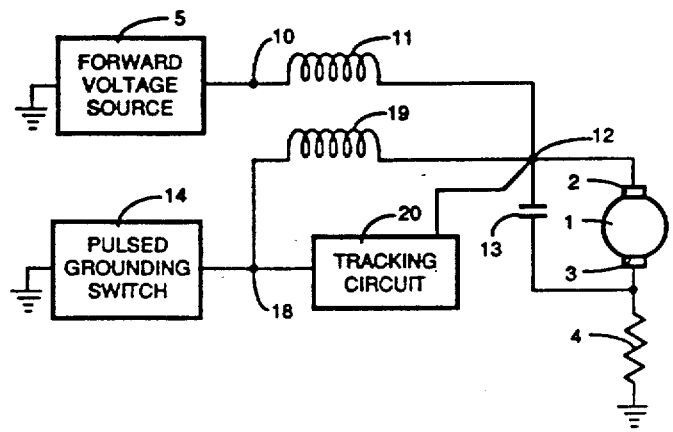

UNITED STATES PATENT AND TRADEMARK OFFICE
CERTIFICATE OF CORRECTION

PATENT NO. : 4,933,609

DATED : June 12, 1990

INVENTOR(S) : Harold V. Clark

It is certified that error appears in the above-identified patent and that said Letters Patent is hereby corrected as shown below:

In the drawing, Fig. 1, Fig.2, Fig.3, Fig.4, Fig.5A and Fig.5B should appear as follows:

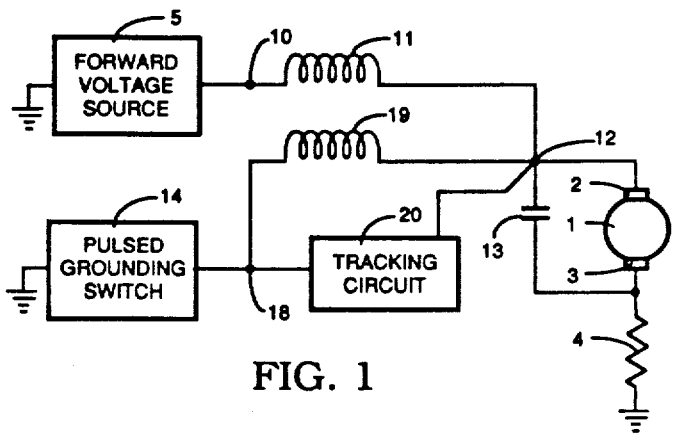

FIG. 1

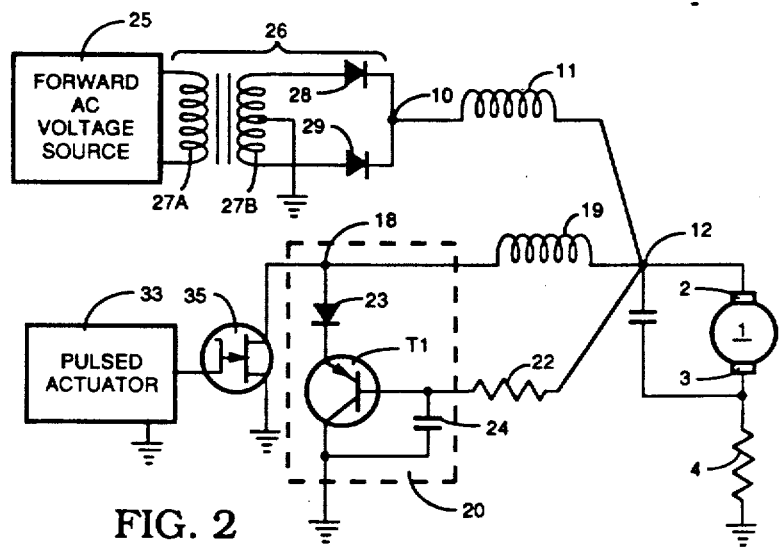

FIG. 2

UNITED STATES PATENT AND TRADEMARK OFFICE
CERTIFICATE OF CORRECTION

PATENT NO. : 4,933,609

DATED : June 12, 1990

INVENTOR(S) : Harold V. Clark

Page 4 of 5

It is certified that error appears in the above-identified patent and that said Letters Patent is hereby corrected as shown below:

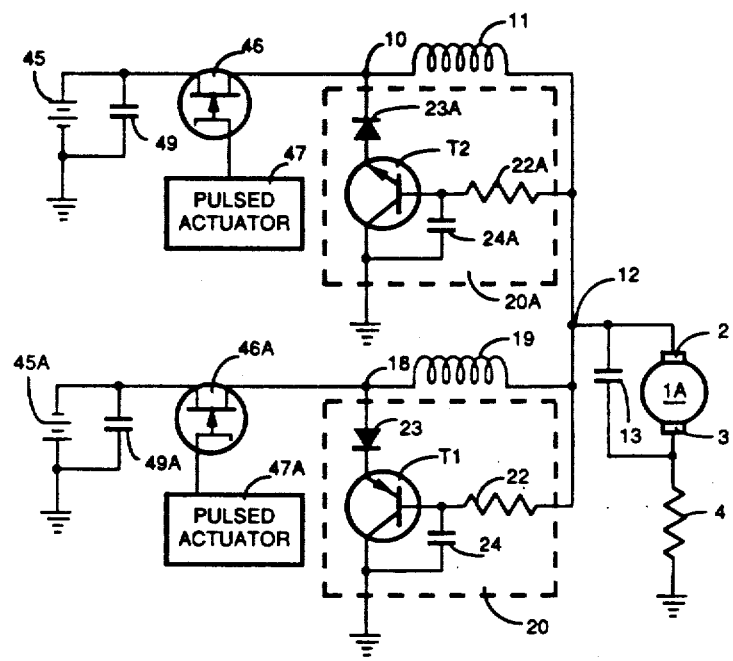

FIG. 3

UNITED STATES PATENT AND TRADEMARK OFFICE
CERTIFICATE OF CORRECTION

PATENT NO. : 4,933,609

DATED : June 12, 1990

INVENTOR(S) : Harold V. Clark

Page 5 of 5

It is certified that error appears in the above-identified patent and that said Letters Patent is hereby corrected as shown below:

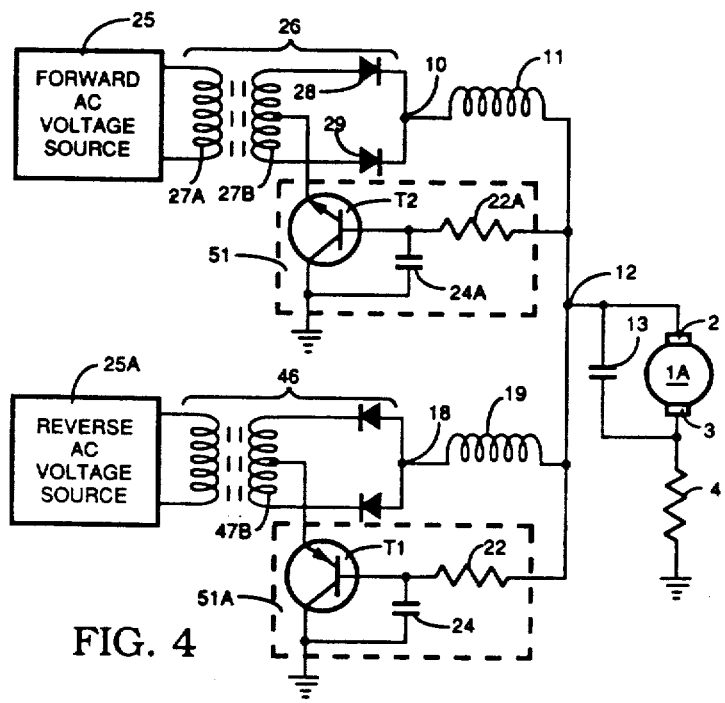

FIG. 4

FIG. 5A

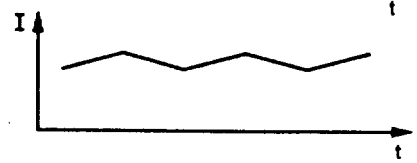

FIG. 5B